United States Patent [19]

Weismuller et al.

[11] Patent Number: 5,021,655
[45] Date of Patent: Jun. 4, 1991

[54] APPARATUS AND METHOD FOR CONTACTLESS MEASUREMENT OF COATING THICKNESS

[75] Inventors: Thomas P. Weismuller, Orange; Charles R. Younger, Moreno Valley, both of Calif.

[73] Assignee: Rockwell International Corporation, El Segundo, Calif.

[21] Appl. No.: 517,796

[22] Filed: May 2, 1990

[51] Int. Cl.$^5$ .................... G01B 15/02; G01N 23/00
[52] U.S. Cl. .................................................. 250/308
[58] Field of Search ........................................ 250/308

[56] References Cited

U.S. PATENT DOCUMENTS

| | | | |
|---|---|---|---|
| 3,720,833 | 3/1973 | Hay | 250/308 |
| 4,424,445 | 1/1984 | Joffe et al. | 250/308 |
| 4,437,012 | 3/1984 | Cavy et al. | 250/491.1 |
| 4,441,022 | 4/1984 | Joffe et al. | 250/308 |
| 4,449,048 | 5/1984 | Pinches et al. | 250/308 |
| 4,451,732 | 5/1984 | Spongr et al. | 250/308 |
| 4,771,173 | 9/1988 | Weismuller | 250/308 |

OTHER PUBLICATIONS

SooHoo et al.,-"Transmittance and Reflectance of a Coated Substrate with Application to Index Measurement of Thin Films," 49 *J. Appl. Phys.* pp. 801-803 (Feb. 1978).

Ingrey-"Analyzing Semiconductors with Auger Spectroscopy," *Test and Measurement World*, pp. 76-82 (Sep. 1983).

B. C. Ames Co.-Accuflow Air Gaging, Catalog 87AG (1987).

*Primary Examiner*—Constantine Hannaher
*Attorney, Agent, or Firm*—H. Fredrick Hamann; George A. Montanye; David J. Arthur

[57] ABSTRACT

An apparatus for measuring the thickness of a coating on a work piece includes a table for receiving and positioning the coated work piece and beta-ray backscatter measuring instrument for determining the thickness of the coating on the work piece. An air gauge measures accurately the position of the surface of the work piece and causes the measuring detector instrument to be positioned a predetermined distance above the surface of the work piece. The air gauge includes an orifice having a known positional relationship with respect to the beta-ray measuring instrument. The air gauge positions the orifice a known distance above a particular location on the surface of the work piece. The apparatus then positions the beta-ray measuring instrument over that particular location on the work piece, at the predetermined distance above the surface.

14 Claims, 5 Drawing Sheets

APPARATUS AND METHOD FOR CONTACTLESS MEASUREMENT OF COATING THICKNESS

BACKGROUND OF THE INVENTION

1. Field of the Invention

This invention relates generally to coating thickness measuring devices, and more particularly to an instrument and method for the non-destructive contactless measurement of contact sensitive, thin coatings on basal substrates by beta-ray backscatter techniques and, even more specifically, to an improved system for precisely locating the beta-ray source of a measuring instrument in a non-contacting position with respect to the specimen to be measured.

2. Description of the Prior Art

Beta-ray backscatter measuring instruments have been extensively utilized to measure the thickness of metallic deposits and coatings of various materials such as, for example, the conductive plating on printed circuit boards or the like. These instruments generally include a source of beta radiation, conveniently a radioactive isotope. This source emits radiation which is directed to strike a metallic coating and the radiation backscatter from the coating is measured by a detector in the form of a Geiger-Mueller tube. An associated electronic counter or readout unit converts the output of the detector into a usable form.

The accuracy and sensitivity of the beta-ray backscatter instrument is largely dependent upon the geometry of the system, that is, the geometric or positional relationship between the source, work piece and detector. To this end auxiliary means for locating the work piece relative to the source and detector are usually incorporated, in accordance with the dictates of the work piece configuration, as a component of most such measuring systems.

Although the beta-ray backscatter instrument is highly useful in taking measurements of thin coatings, problems have arisen in properly and precisely locating the source and detector with respect to the work piece.

Another problem with present beta-ray backscatter techniques is that, heretofore, a contact method has often been used. The sample is placed in contact with the metallic surface over which it is then scanned by the Geiger-Mueller detector. This contact is generally not a problem in the plating industry because the metallic surfaces are highly forgiving of contact with other metal surfaces. However, in certain cases, contact of any type is detrimental when the surface to be measured is very soft or very brittle. For example, thickness measurements requiring direct physical contact with epitaxial coatings of mercury cadmium telluride (HgCdTe) or of cadmium telluride (CdTe) electro optical films result in damage to or destruction of the coating.

Several methods have been used and are being used to determine the thickness of epitaxial deposits. In the case of HgCdTe or CdTe, one method has been to use destructive cleave measurements. In this method, the deposited substrate is broken up by cleaving it along a fracture line. A cross-section of that piece is then microscopically examined to visually determine the thickness of the epitaxial coating. This method has the obvious disadvantage of being destructive and, therefore, is not suitable for a production line type determination.

Non-destructive method of determining the thickness of epitaxially deposited coatings is to measure optical interference fringes. This is accomplished with the use of an infrared spectrometer by performing an optical transmission in the desired infrared region. Results from such a transmission are sine-shaped interference fringe patterns. The period of these fringes, in other words, the distance between peaks of the sine waves plotted by the infrared spectrometer, is calculatable back to what the thickness of the epitaxial deposit is. This particular method is well known in the art, compatible with production line environments, and is commonly used. (For example, see an article entitled "Transmittance and Reflectance of a Coated Substrate with Application to Index Measurement of Thin Films", by J. SooHoo and R. D. Henry, J. Appl. Phys., Vol. 49, No. 2, February 1978.) One disadvantage of this method, however, is that the measuring instrument itself is very expensive. The process is time consuming, taking several minutes for each determination. Further, the sample to be measured must be placed in a chamber and purged of air so there is additional waiting time incurred before a measurement can even be taken. A measurement using the infrared spectrometer typically runs approximately three minutes followed by an additional three minute purge process. In addition, a standardization procedure must be performed periodically for calibration. Another major disadvantage to the use of the infrared spectrometer is that not only is it time consuming but also that it is not adequate for use with samples where the coating or the substrate has uneven or irregular surfaces. An irregular surface results in an interference pattern which is not readily interpretable.

Another approach to thickness determination which is destructive to the sample, is scanning electron microscope (SEM), auger, or similar instrumental analysis. These analyses require samples to be sectioned into small pieces and then subjected to time consuming and destructive measurement. This particular method is acceptable for production spot analysis but is certainly unsuitable for in-line production thickness measurements. An article of interest in this area appeared in Test and Measurement World, pgs. 76-82, September 1983, entitled "Analyzing Semiconductors with Auger Spectroscopy."

A method and apparatus for the contactless determination of the thickness of a coating on a work piece is described in U.S. Pat. No. 4,771,173 to Weismuller. The device there described includes a beta-ray backscatter instrument for measuring the coating thickness. The beta-ray backscatter measuring instrument includes a radiation source, and a radiation detector to measure the amount of backscatter, which is correlated to the thickness of the coating being measured. The radiation source and the radiation detector are carried in a measuring objective, which includes an aperture that is brought into an close but non-contacting position with respect to the area of the coating for which the thickness is to be measured. The distance between the measuring objective and the work piece is accurately and repeatedly controlled by the use of an optical focussing system. Such a system provides highly repeatable results, and is extremely useful in many applications. Nevertheless, because of the optical focussing requirements, that system is not readily adaptable to automation. For use in production environments, automation is desirable both for increased production throughput, and to permit more measurements to be taken on each wafer (work piece) for more accurate contour mapping.

SUMMARY OF THE INVENTION

The present invention is a measuring apparatus for the contactless measuring of the thickness of the coating on a work piece. The apparatus includes a table for receiving and positioning a coated work piece, and a beta-ray measuring instrument for determining the thickness of the coating on the work piece. The apparatus additionally includes an air gauge connected to the measuring instrument for positioning the measuring detector a predetermined distance above the surface of the work piece, as determined by the air gauge.

According to the method of the invention, the work piece is placed on a table surface, with the coated surface of the work piece facing away from the table surface. A first end of a conduit is positioned over a first location on the work piece and gas is supplied through the conduit against the coated surface of the work piece. The pressure of the gas in the conduit is detected, and the conduit is moved vertically over the first location until the pressure in the conduit reaches a predetermined value. A beta-ray measuring instrument is moved a predetermined amount vertically with respect to the first end of the conduit. The work piece and the beta-ray measuring instrument are moved with respect to each other until the beta-ray measuring instrument is positioned over the first location on the work piece, and the beta-ray measuring instrument is used to take a measurement of the thickness of the coating.

DETAILED DESCRIPTION OF THE PREFERRED EMBODIMENT

Figure 1:
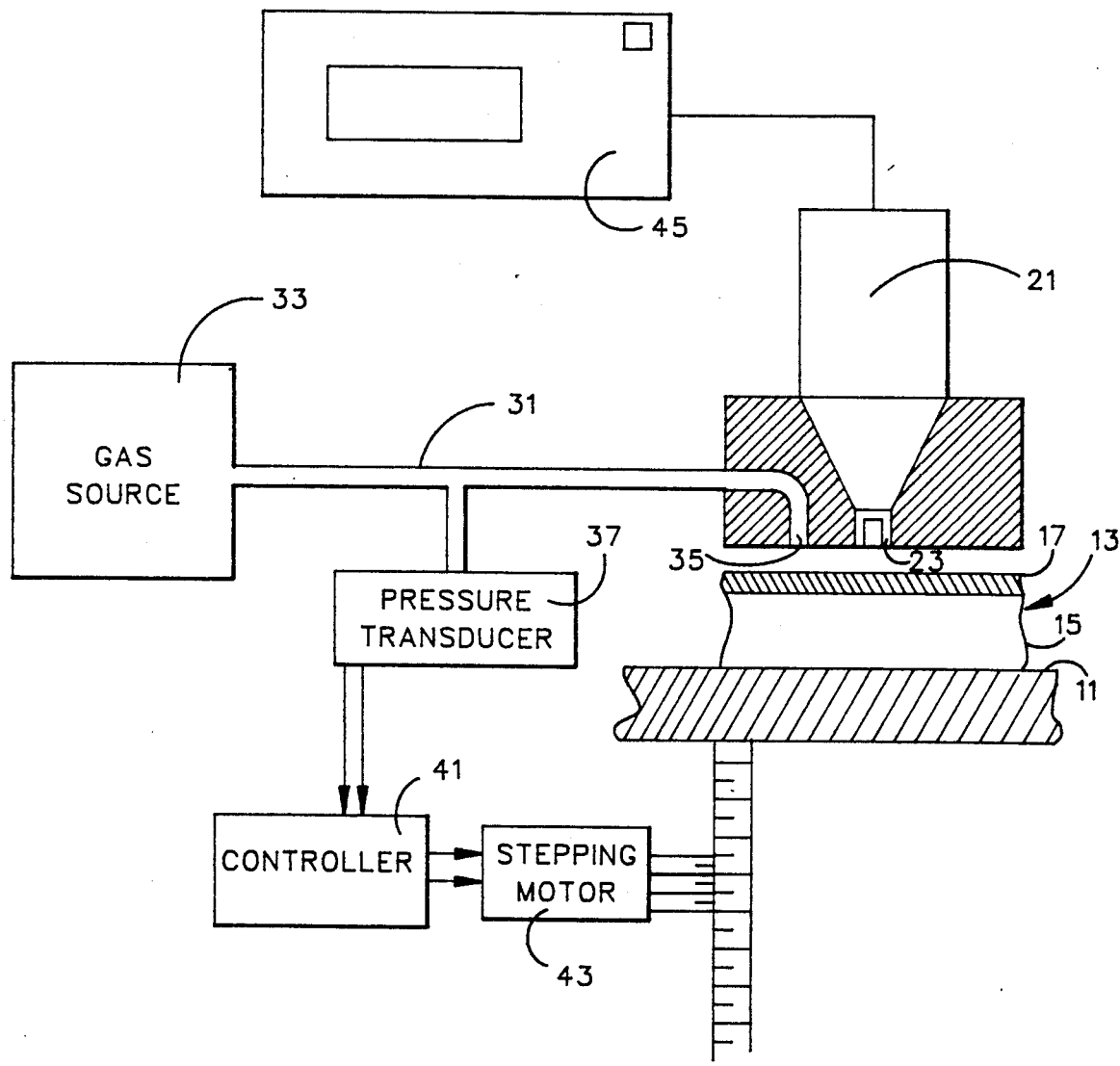
FIG. 1 is a diagram of the contactless measurement system of the invention, shown partially in cross-section.

Referring to FIG. 1, an embodiment of the apparatus of the invention s illustrated in diagram form. A noncontaminating table 11 is provided for receiving a coated work piece 13, such as a substrate 15 having a epitaxial coating 17 of mercury cadmium telluride (HgCdTe) or of cadmium telluride (CdTe) electro-optical film.

As is known in the art, an instrument for measuring beta-ray backscattering, such as a Geiger-Mueller tube 21, can be used to measure the thickness of the film 17 on the substrate. To make such a measurement, however, it is necessary to place the Geiger-Mueller tube 21 a precise distance above the surface of the coated work piece. Typically, the aperture 23 of the Geiger-Mueller tube should be placed within about 0.005 and 0.010 inches (0.010–0.26 cm) above the surface of the coated work piece.

To precisely position the Geiger-Mueller tube in accordance with the invention, an air gauge is incorporated with the measuring instrument. This air gauge uses gas pressure to repeatably determine the vertical position of the Geiger-Mueller tube with respect to the surface of the work piece. The air gauge includes a gas conduit 31 having a first end connected to a gas source 33, and a second end for supplying a gas from the gas source to the gap between the Geiger-Mueller tube and the surface of the coated work piece. The gas flowing through the conduit exits through an opening or orifice 35 at the end of the conduit into the space between the end of the Geiger-Mueller tube and the surface of the coated work piece. A pressure transducer 37 monitors the pressure in the gas conduit 31.

A controller 41, electrically connected to the pressure transducer 37, monitors the readings taken by the pressure transducer. The controller governs the relative position, vertically, of the table 11 bearing the work piece, and the beta-ray backscatter measuring instrument 21. In the illustrated embodiment, the controller s electrically connected to a stepping motor 43 that adjusts the vertical position of the table supporting the coated work piece. As the table is slowly brought vertically upward, closer to the aperture or orifice, the back pressure of the gas stream in the conduit increases. The increased pressure is monitored by the pressure transducer. When the pressure in the conduit reaches a predetermined level, the controller causes the stepping motor to stop the movement of the table.

Alternatively, the stepping motor can be used to adjust the vertical position of the Geiger-Mueller tube, while the table supporting the coated work piece remains stationary.

Because of the requirements of the backscatter measuring apparatus, the pressure transducer, controller, and stepping motor should be sufficiently accurate to be able to reproducibly position the work piece in relation to the Geiger-Mueller tube within about ±0.0002 inches (±0.0005 cm).

To operate effectively, the input gas supply must be kept at nearly constant pressure. It is preferred that an inert gas such as nitrogen be used, to avoid contamination or interference with the coating on the work piece.

As is known to those familiar with the art, the table 11 and the beta-ray backscatter measurement instrument 21 are preferably movable with respect to each other in the XY plane, to be able to take coating thickness measurements at different places on the work piece without requiring that the work piece be moved on the table. Such movement may be provided in up to six degrees of freedom (X, Y, and rotation).

As is conventional, an electronic readout unit 45 is electrically connected to the Geiger-Mueller tube for providing an appropriate measurement output. A suitable readout unit is obtainable from Twin City International, Inc., 175 Pineview Drive Audubon Industrial Park, Amherst, N.Y. 14150. Alternatively, the output of the measuring instrument can be connected to an electronic computer or other analysis equipment.

Figure 2:
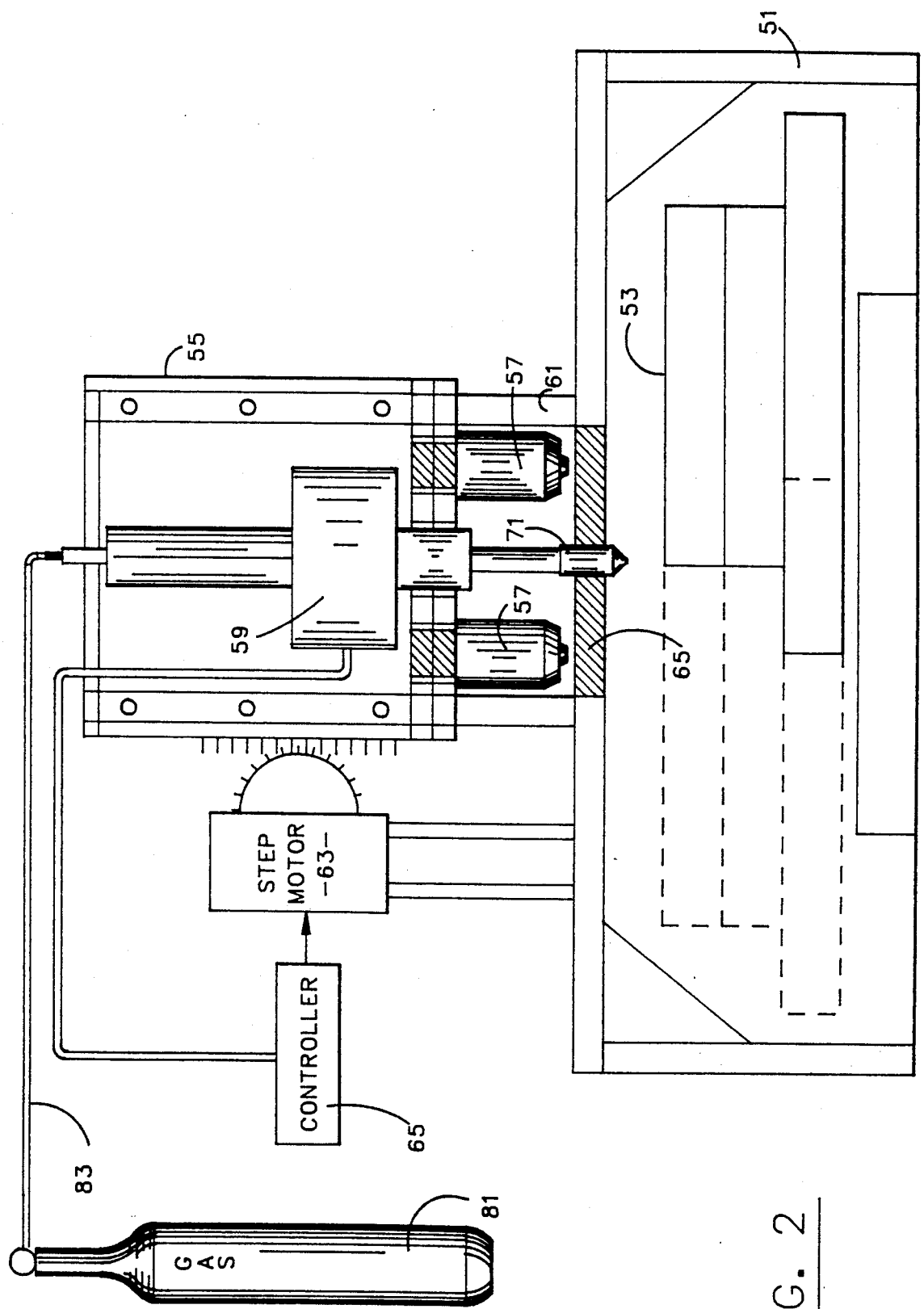
FIG. 2 is a diagram of another embodiment of the system of the invention, shown partially in cross-section.

Referring now to FIG. 2, a different embodiment of the system constructed according to the invention is shown. The system includes a base or platform 51. A noncontaminating table 53 is positioned under the base for receiving a coated work piece such as a substrate having a coating of mercury cadmium telluride (HgCdTe) or of cadmium telluride (CdTe) electro-optical films. As shown, the table is horizontally translatable. The solid lines represent one position that the movable table can take, while the dashed lines represent another position. Preferably this table is movable in at least X and Y direction, and may also be rotatable with respect to the platform. The degrees of freedom of movement for this table will vary depending on the application and the measurements desired.

Mounted on the base is a frame 55 for holding the beta-ray backscatter measuring instruments 57 for measuring coating thickness, which may be one or more Geiger-Mueller tubes, and an air gauge 59. Depending on the application, the measuring instruments may include a cadmium 109 thickness measuring detector, a promethium 147 thickness measuring detector, and/or a strontium 90 thickness measuring detector. The Geiger-Mueller tubes and the main body or housing of the air gauge are securely attached to the frame to provide a fixed, known positional relationship between them, both vertically and horizontally. Thus, once the exact position of the air gauge housing is known or established, the positions of the backscatter measuring instruments are known.

The frame 55 and the work piece table 53 are movable vertically with respect to one another. In the illustrated embodiment, the frame 55 can be moved vertically on support posts 61 by a step motor 63 under the control of a controller 65. The step motor is also firmly attached to the base structure 51.

An opening 65 through the platform surface of the base permits the probe 71 of the air gauge and the Geiger-Mueller tubes 57 to be moved downward to the work piece mounted on the movable table.

A gas source 81, represented by a canister of gas, supplies a gas through a gas conduit 83 to the air gauge 59 for use in its measurements, as will be described subsequently. The gas is preferably an inert gas such as nitrogen, and is supplied at a substantially constant pressure.

Figure 3:
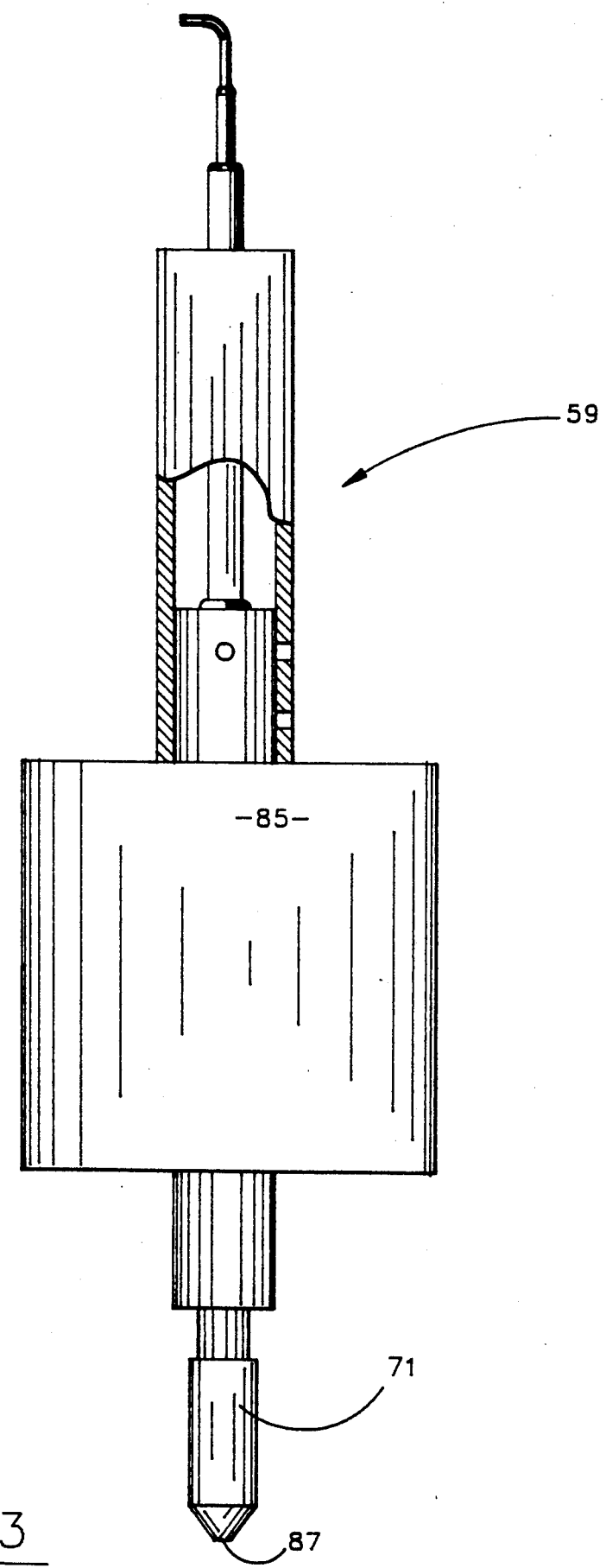
FIG. 3 shows, partially in cross-section, the air gauge used in the system of the invention.

FIG. 3 shows, partially in cross section, the air gauge 59, which may also be called an air follower, in greater detail. The air gauge is commercially available. An example is model AF798-100, available from D. C. Ames Company of Waltham, Mass. That air gauge or air follower uses gas pressure to establish a constant ar gap between the nozzle and the surface of the work piece.

This air gauge or air follower includes a main body 85 housing a portion of the gas conduit, and a retractable probe 71 having a nozzle 87 on its end, with an orifice at the end of the nozzle. The retractable probe and nozzle contain a continuation of the gas conduit, so that the orifice is at the end of the conduit. As shown in FIG. 2, the body 85 is mounted to the frame that also contains the Geiger-Mueller tubes to establish a fixed positional relationship between the air follower body and the beta-ray measuring instrument. Also contained in the air gauge housing is a mechanism for measuring, from a pre-established reference point, relative movement of the retractable probe and the housing. This measurement may be provided as an electronic readout to the controller 65 for the stepper motor 63. That measurement mechanism s part of the commercially available air gauge.

Knowledge of the relative positions of the housing 85 and the probe provides knowledge of the relative positions of the probe 71 and the radiation backscatter measurement instrument 57.

The operation of the apparatus shown in FIG. 2 for bringing the beta-ray backscatter measuring instrument into a predetermined position above a coated work piece so that it can accurately measure the coating thickness will now be described.

The coated work piece is placed on the surface of the translatable table 53 with the coated surface facing away from the table. With the gas flowing through the conduit 83 of the air gauge, the frame 55 bearing the air gauge housing is moved downward to bring the nozzle of the retractable probe 71 in the proximity of the coated surface of the work piece over a predetermined location on the work piece.

As the probe approaches the surface of the work piece, and the gap between the orifice and the surface becomes smaller, the pressure in the conduit increases.

The air follower is preset to hold the end of the nozzle 71 a predetermined distance above the coated surface of the work piece, based on measurement of the back pressure in the gas conduit.

Because the air gauge measures the exact relative positions of the air gauge housing and the nozzle on the retractable probe, the exact position of the work piece surface is established relative to the frame 55 carrying the air follower 59 and the radiation measurement instruments 57. The probe of the air follower is then retracted so it does not accidentally contact the surface of the work piece in the subsequent steps.

The translatable table 53 on which the work piece is mounted may then be moved so that the location on the work piece that was under the air follower probe is directly under one of the Geiger-Mueller tubes. The frame 55 carrying the Geiger-Mueller tubes may then be lowered until the Geiger-Mueller tube is a predetermined distance above the selected location on the work piece. Because the air follower determined the exact vertical position location of the surface of the work piece relative to the frame carrying the beta-ray measuring instrument at that location on the work piece, the controller can cause the stepping motor to move the frame a precise amount to place the opening in the tube the precise desired distance above the surface of the work piece at that location.

The coating thickness measuring detector 57 is preferably of the beta-ray backscatter measurement type known to those skilled in the art. Such a measurement instrument typically includes a radiation source and a radiation detector for detecting the amount of backscattered radiation.

Figure 4:
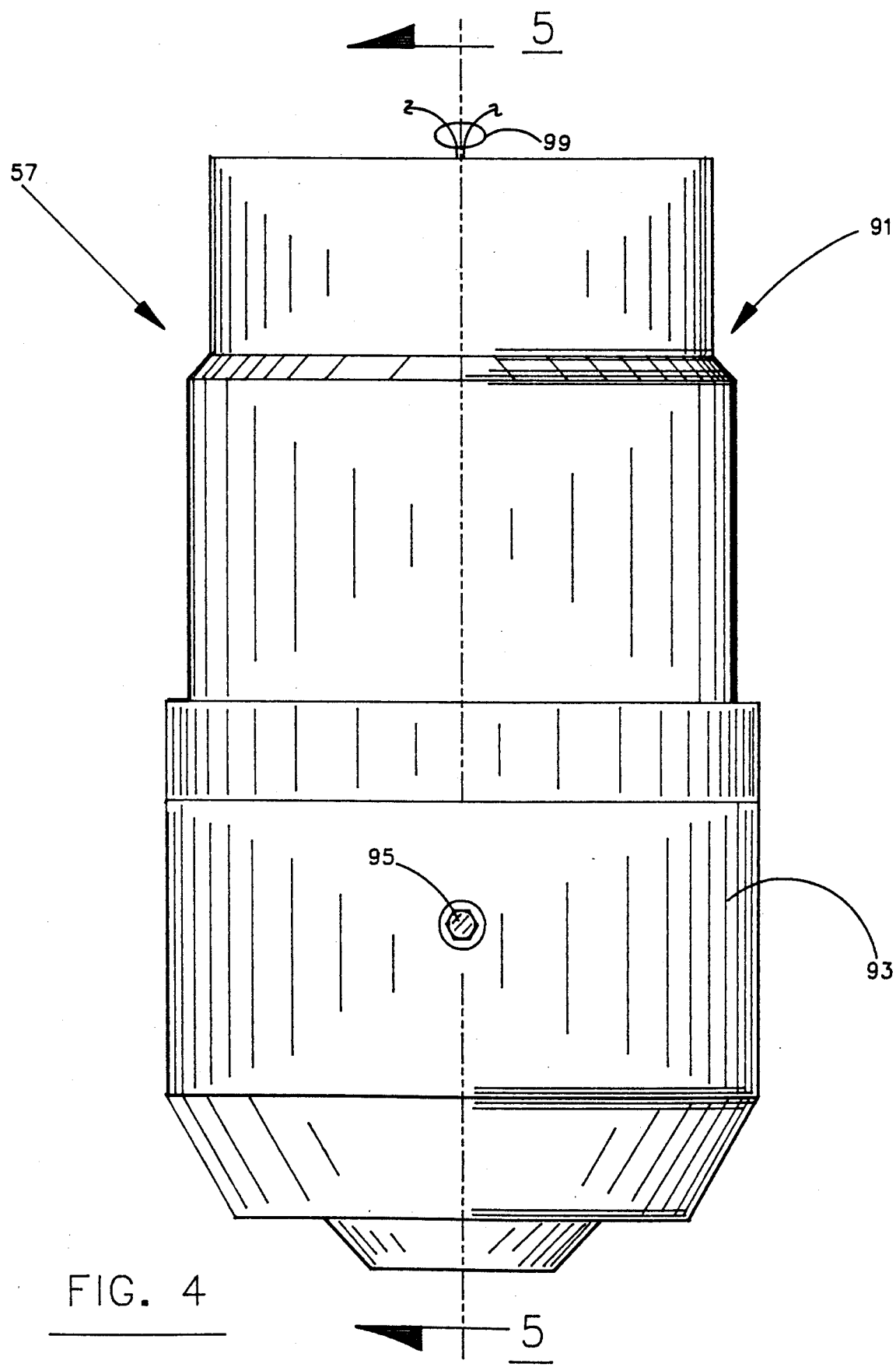
FIG. 4 is a elevational view of the thickness measuring detector.

Referring now to FIG. 4, an enlarged elevational view of a representative coating thickness measuring detector 57 is illustrated. The thickness measuring detector comprises an upper casing 91, a lower casing 93, and a set screw 95. The set screw maintains a Geiger-Mueller detector tube within the lower casing. The detector tube is shown in the cross-sectional view of FIG. 5.

A cable exit orifice 97 (See FIG. 5) is provided to allow passage of the detector input/output cable 99 from upper casing to a conventional electronic readout counter unit.

Figure 5:
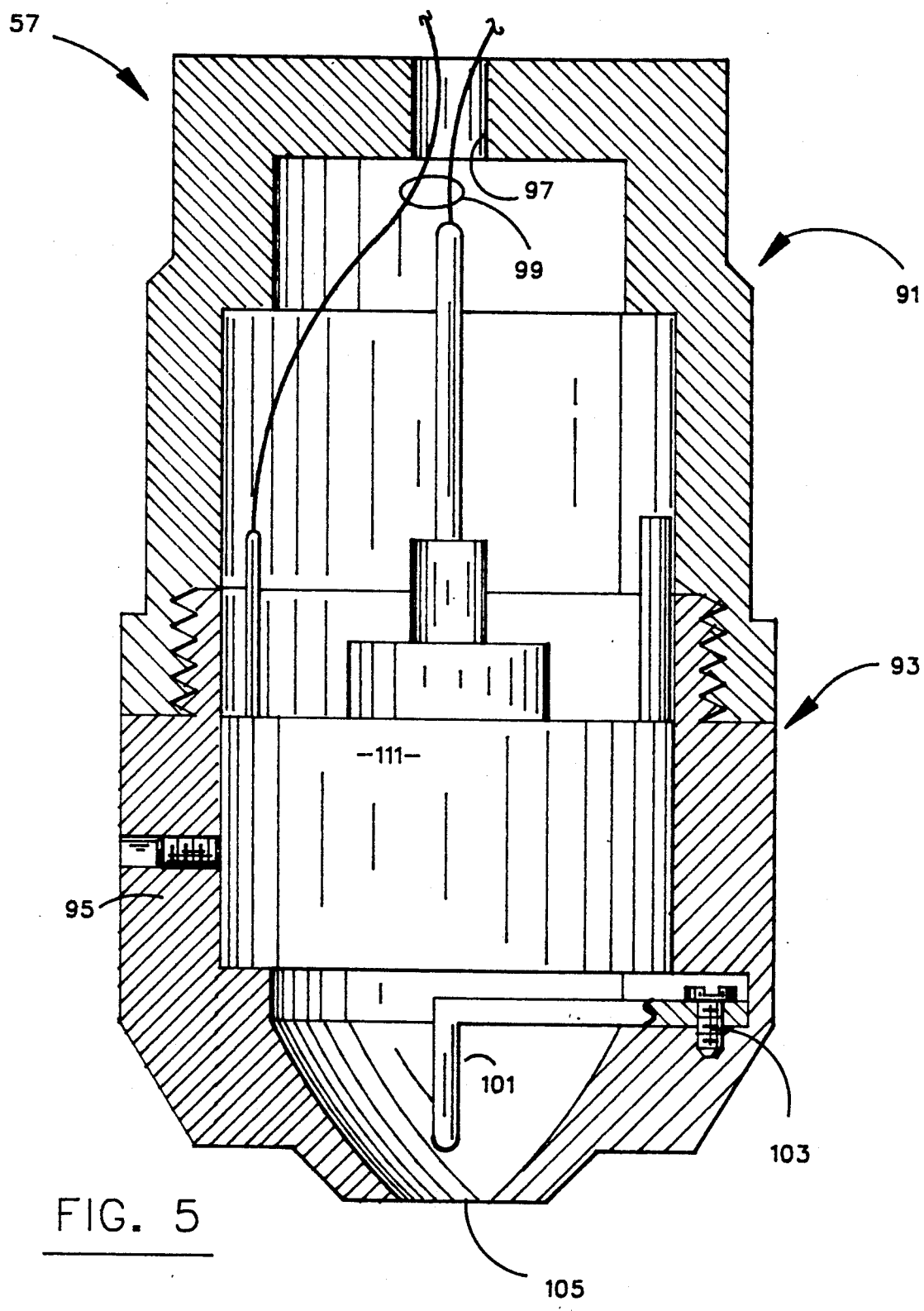
FIG. 5 is a cross-sectional view of the thickness measuring detector, taken along line 5—5 of FIG. 4.

Turning now to FIG. 5, a cross-sectional view has been taken along line 5—5 of FIG. 4 illustrating a representative thickness measuring detector. In this view, the lower casing 93 is shown screwed into the upper casing 91. This bicameral construction allows for ease of manufacture and for access to repair the inner components of the thickness measuring detector.

The thickness measuring detector further comprises an isotope pedestal 101 which is shown securely attached to the casing by a screw 103. The isotope pedestal is essentially a holder for one of any number of desired radio-active isotopes. The isotope held by pedestal may, for example, be promethium 147, strontium 90, or cadmium 109.

An exposure aperture 105 is provided so that the beta radiation, which is rather non-penetrating in nature, can pass from the thickness measuring detector to strike the desired portion on the surface of the coated work piece. The Geiger-Mueller tube 111 is shown firmly affixed within the lower casing 93 by the set screw 95. The system contemplated by the isotope pedestal and the Geiger-Mueller tube may be of any suitable type and is illustrated as the general type and character disclosed in U.S. Pat. No. 3,720,833.

A geometry is provided which will allow a working distance to exist between the coated work piece and the exposure aperture 105 such that suitable calibration curves can be generated, with adequate measurement precision, so as to be displayed in a meaningful fashion on a conventional electronic readout unit. More particularly, the working distance between the coated work piece and the exposure aperture should be kept constant to within ±3 microns to maintain repeatability and accuracy of thickness measurements from coated work piece to coated work piece. If the working distance is much greater than 5 millimeters from the coated work piece, then the Geiger-Mueller tube may be unable to detect the radioactive backscatter due to a low signal to noise ratio.

Although exemplary embodiments of the invention have been described in detail to aid in the understanding of the invention, certain modifications to the particulars will be apparent to those skilled in the art without departing from the spirit of the invention. Therefore, the scope of the invention is defined not by the foregoing description, but by the following claims.

I claim:

1. Measuring apparatus for measuring the thickness of a coating on a work piece, comprising:
    a table for receiving and positioning a coated work piece thereon;
    a beta-ray measuring instrument for determining the thickness of the coating on said work piece; and
    an air gauge connected to said measuring instrument for positioning said measuring instrument a first predetermined distance above the surface of said work piece.

2. The measuring apparatus of claim 1, wherein said air gauge includes an orifice and said air gauge positions said orifice a second predetermined distance above the surface of said work piece, said measuring instrument has a known positional relationship with respect to said orifice, and said measuring apparatus additionally comprises:
    means for positioning sad orifice over a predetermined location on said work piece; and
    means for positioning said measuring instrument over said predetermined location on said work piece sad first predetermined distance above the surface of said work piece.

3. The measuring apparatus of claim 2, wherein said measuring instrument positioning means comprises means for moving said table from a first position in which said predetermined work piece location is under said orifice to a second position in which said predetermined work piece location is under said measuring instrument.

4. The measuring apparatus of claim 2, wherein said measuring instrument positioning means comprises means for moving said measuring instrument to a position over said predetermined work piece location.

5. The measuring apparatus of claim 2, wherein said air gauge comprises:
    a conduit having a first end and a second end, wherein said orifice is at said first end of said conduit;
    a pressure transducer connected to said conduit for measuring gas pressure in said conduit; and
    a controller connected to said pressure transducer and said conduit for vertically moving said conduit until the pressure in said conduit reaches a predetermined value.

6. Measuring apparatus for measuring the thickness of a coating on a work piece, comprising:
    a table for receiving and positioning a coated work piece thereon;
    a measuring instrument including a radiation source and a radiation detector to determine the thickness of said coating on said work piece;
    an air gauge comprising:
        a conduit having a first end and a second end, wherein said first end is connected to a gas source;
        an orifice at the second end of said gas conduit; and
        positioning means responsive to the gas pressure in said conduit for positioning said orifice said first predetermined distance above the surface of said coated work piece over a first location on said work piece;
    an attachment between said conduit and said measuring instrument for placing said measuring instrument in a known positional relationship with respect to said orifice; and
    means for positioning said measuring instrument over said first location on said work piece so that said measuring instrument is positioned a second predetermined distance above the surface of said work piece.

7. The measuring apparatus of claim 6, wherein said positioning means comprises means for moving said table from a first position in which said predetermined work piece location is under said orifice to a second position in which said predetermined work piece position is under said measuring instrument.

8. Apparatus for positioning a beta-ray measuring instrument for measuring the thickness of a coating on a work piece a predetermined distance above the surface of said work piece, wherein said work piece is positioned on a table, the apparatus comprising:
    a conduit having a first end and a second end, wherein said first end is connected to a gas source;
    an orifice at the second end of said gas conduit, wherein said orifice has a known vertical positional relationship with respect to said measuring instrument, and said orifice is maintained a predetermined distance above the surface of said coated work piece in response to the pressure in said conduit;
    first positioning means connected to said orifice, to said beta-ray measuring instrument, and to said table for moving said table from a first position in which a first location on said work piece is positioned under said orifice to a second position in which said first location on said work piece is positioned under said measuring instrument.

9. The apparatus of claim 8 additionally comprising a housing attached to said conduit, wherein:

said second end of said conduit and said orifice are movable vertically with respect to said housing; and said housing includes measurement means for determining the vertical position of said orifice with respect to said housing.

10. The apparatus of claim 9, wherein said beta-ray measuring instrument is affixed to said housing, and said apparatus additionally includes second positioning means for moving said measuring instrument and said housing vertically with respect to said table.

11. Measuring apparatus for measuring the thickness of a coating on a work piece, comprising:
   a table for receiving and positioning a coated work piece thereon;
   a measuring instrument including a radiation source and a radiation detector to determine the thickness of said coating on said work piece;
   an air gauge comprising:
      a gas source;
      a housing;
      a conduit attached to said housing, said conduit having a first end and a second end, wherein said first end of said conduit is connected to said gas source, and said second end has an orifice for directing the flow of gas vertically downward,
      a connection between said orifice and said housing to allow said orifice to move vertically with respect to said housing so that said orifice maintains a predetermined spacing from the surface of said coated work piece, said connection including means for identifying the relative vertical position of said orifice with respect to said housing;
   a frame attached to said housing and said measuring instrument for holding said housing and said measuring instrument in a known positional relationship;
   first positioning means for moving said frame vertically until said housing has a predetermined vertical positional relationship with respect to said orifice; and
   second positioning means for moving said table horizontally with respect to said frame.

12. A method of measuring the thickness of a coating on a work piece, comprising:
   placing said coated work piece on a table surface, with the coated surface of said work piece facing away from the table surface;
   positioning an orifice connected at a first end of a conduit over a first location on said work piece;
   supplying a gas through said conduit and said orifice against said coated surface of said work piece;
   detecting the pressure of said gas in said conduit;
   moving said orifice vertically over said first location until the pressure in said conduit reaches a predetermined value;
   moving a beta-ray coating thickness measuring instrument a predetermined amount vertically with respect to said orifice;
   moving said table surface and said measuring instrument horizontally with respect to each other until said beta-ray measuring instrument is positioned over said first location;
   measuring the thickness of said coating using said beta-ray measuring instrument.

13. The method of claim 12, wherein said step of moving said table surface and said beta-ray measuring instrument with respect to each other comprises moving said work piece while said beta-ray measuring instrument remains stationary.

14. The method of claim 12, wherein said step of moving said table surface and said beta-ray measuring instrument with respect to each other comprises moving said beta-ray measuring instrument while said work piece remains stationary.

* * * * *